United States Patent
Kweon et al.

(10) Patent No.: US 6,972,134 B2
(45) Date of Patent: *Dec. 6, 2005

(54) METHOD OF PREPARING POSITIVE ACTIVE MATERIAL FOR RECHARGEABLE LITHIUM BATTERIES

(75) Inventors: Ho-Jin Kweon, Cheonan (KR); Jun-Won Suh, Cheonan (KR); Won-Il Jung, Cheonan (KR); Jeong-Joon Park, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 34 days.

This patent is subject to a terminal disclaimer.

(21) Appl. No.: 09/963,872

(22) Filed: Sep. 25, 2001

(65) Prior Publication Data

US 2002/0076486 A1 Jun. 20, 2002

(30) Foreign Application Priority Data

Sep. 25, 2000 (KR) ............... 2000-56247
Jun. 22, 2001 (KR) ............... 2001-35727

(51) Int. Cl.⁷ ............... B05D 5/12; B05D 3/12; B05D 7/00
(52) U.S. Cl. ............... 427/58; 427/115; 427/126.1; 427/126.3; 427/212; 427/217; 427/242
(58) Field of Search ............... 427/58, 115, 126.3, 427/126.1, 212, 217, 242; 429/231.95, 137

(56) References Cited

U.S. PATENT DOCUMENTS

| | | | |
|---|---|---|---|
| 4,959,282 A * | 9/1990 | Dahn et al. | 429/224 |
| 5,705,291 A * | 1/1998 | Amatucci et al. | 429/137 |
| 5,733,685 A * | 3/1998 | Wang | 429/224 |
| 5,783,328 A | 7/1998 | Wang | |
| 5,939,043 A * | 8/1999 | Yahagi | 423/599 |
| 6,372,385 B1 * | 4/2002 | Kweon et al. | 429/231.95 |
| 6,531,220 B1 * | 3/2003 | Kweon et al. | 428/402 |
| 6,558,844 B2 | 5/2003 | Howard, Jr. et al. | |
| 6,653,021 B2 * | 11/2003 | Kweon et al. | 429/231.1 |
| 2002/0071990 A1 * | 6/2002 | Kweon et al. | 429/231.1 |
| 2002/0076613 A1 | 6/2002 | Lee et al. | 429/231.1 |
| 2002/0119372 A1 | 8/2002 | Zhang | 429/218.1 |

FOREIGN PATENT DOCUMENTS

| | | | |
|---|---|---|---|
| CH | 1266288 A | | 9/2000 |
| JP | 55210 | * | 2/1997 |
| JP | 16566 | * | 1/1999 |

OTHER PUBLICATIONS

U.S. Appl. No. 09/964,263, Kweon et al.
U.S. Appl. No. 09/966,572, Kweon et al.
Amatucci et al; 'Surface treatments of $Li_{1+x}Mn_{2-x}O_4$ spinels for improved elevated temperature performance'; Solid State Ionics 104 (1997);. pp. 13-16.

* cited by examiner

Primary Examiner—Brian K. Talbot
(74) Attorney, Agent, or Firm—Christie, Parker and Hale, LLP

(57) ABSTRACT

A method of preparing for a positive active material for a rechargeable lithium battery is provided. In this method, a lithiated compound to be coated and an organic solution or aqueous solution including a coating-element source are putted into a mixer, the mixture is continuously stirred to mix the contents thoroughly, and a hot dry gas is introduced into the mixer to evaporate the solvent while the powder is continuously agitated. The resulting dry coated powdery compound is heat-treated at an elevated temperature to obtain an oxide coating on the lithiated compound.

24 Claims, 2 Drawing Sheets

US 6,972,134 B2

METHOD OF PREPARING POSITIVE ACTIVE MATERIAL FOR RECHARGEABLE LITHIUM BATTERIES

CROSS REFERENCE TO RELATED APPLICATION

This application is based on application Nos. 2000-56247 and 2001-35727 filed with the Korean Industrial Property Office on Sep. 25, 2000, and Jun. 22, 2001, the contents of which are incorporated herein by reference.

FIELD OF THE INVENTION

The present invention relates to a method of preparing a positive active material for a rechargeable lithium battery, and particularly, to an economically viable method of preparing the positive active material using a simple process for rechargeable lithium batteries.

BACKGROUND OF THE INVENTION

Rechargeable lithium batteries use a material from or into which lithium ions are deintercalated or intercalated for the positive and negative active materials. For an electrolyte, an organic solvent or polymer is used. Rechargeable lithium batteries produce electric energy as a result of changes in the chemical potentials of the active materials during the intercalation and deintercalation reactions of lithium ions.

For the negative active material in a rechargeable lithium battery, metallic lithium has been used in the early days of development. Recently, however, carbon materials, which intercalate lithium ions reversibly, are extensively used instead of the metallic lithium due to problems of high reactivity toward electrolyte and dendrite formation of the metallic lithium. With the use of carbon-based active materials, the potential safety problems which are associated with the metallic lithium can be prevented while achieving relatively high energy density, as well as a much improved cycle life. In particular, boron may be added to carbonaceous materials to produce boron-coated graphite (BOC) in order to increase the capacity of the carbonaceous materials.

For the positive active material in the rechargeable lithium battery, chalcogenide compounds into or from which lithium ions are intercalated or deintercalated are used. Typical examples include $LiCoO_2$, $LiMn_2O_4$, $LiNiO_2$, $LiNi_{1-x}Co_xO_2$ ($0<x<1$) and $LiMnO_2$. Manganese-based materials such as $LiMn_2O_4$ and $LiMnO_2$ are easier to prepare and less expensive than the other materials and are environmentally friendly. However, manganese-based materials have a low capacity. $LiNiO_2$ is inexpensive and has a high capacity, but is difficult to prepare in the desired structure and is relatively less stable in the charged state causing a battery safety problem. $LiCoO_2$ is relatively expensive, but widely used as it has good electrical conductivity and high cell voltage. Most commercially available rechargeable lithium batteries (at least about 95%) use $LiCoO_2$.

Although $LiCoO_2$ exhibits good cycle life characteristics and good flat discharge profiles, there are still demands to improve electrochemical properties such as good cycle life and high power density.

One way to satisfy such a demand is to substitute a part of the Co from $LiCoO_2$ with other metals. Sony studied $Li_xCo_{1-y}Al_yO_2$ by doping about 1 to 5 percent by weight of $Al_2O_3$ into $LiCoO_2$. A&TB (Asahi & Toshiba Battery Co.) studied a Sn-doped Co-based active material by substituting a part of Co from $LiCoO_2$ with Sn.

Even though these studies have progressed, there are still demands for improving electrochemical properties such as high capacity, long cycle life, high power density and exhibiting improved thermal safety.

SUMMARY OF THE INVENTION

It is an object of the present invention to provide a method of preparing a positive active material for an economical rechargeable lithium battery by a simple process.

It is another object to provide a method of preparing a positive active material for an economical rechargeable lithium battery having a uniform coating layer by the simple process.

It is another object to provide a method of preparing a positive active material for a rechargeable lithium battery having a longer cycle life and excellent discharge voltages.

In order to achieve these objects, the present invention provides a method of preparing a positive active material for a rechargeable lithium battery. In this method, a lithiated compound and an organic solution including a coating-element source or an aqueous solution including the coating-element source are put into a mixer, and the lithiated compound is coated with the organic or the aqueous solution, while increasing the ambient temperature and mixing. Then, the coated lithiated compound is heat-treated to form a surface-treatment layer on the lithiated compound. When the organic solution or aqueous solution includes an Al or B source, an $Al_2O_3$ layer or a B-included oxide surface-treatment layer is formed on the lithiated compound.

BRIEF DESCRIPTION OF THE DRAWINGS

A more complete appreciation of the invention, and many of the attendant advantages thereof, will be readily apparent as the same becomes better understood by reference to the following detailed descriptions when considered in conjunction with the accompanying drawings, wherein.

DETAILED DESCRIPTION OF THE INVENTION

The present invention relates to a simpler preparation technique for a positive active material than the conventional process.

Figure 1:
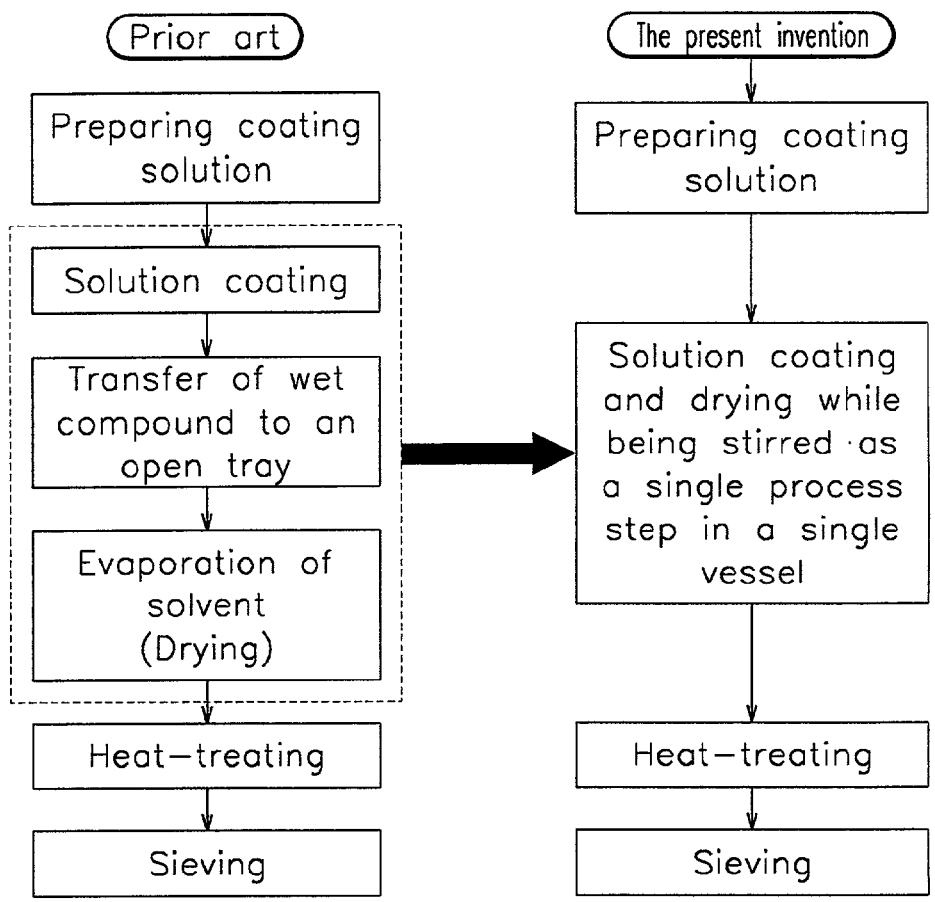
FIG. 1 is a schematic diagram illustrating processes for producing a positive active material according to the present invention and a conventional production procedure, respectively.

For an easy understanding, the coating process of the present invention is graphically compared in FIG. 1 with a state-of-the-art coating process, which is used for production of the coated active material for Li-ion battery cells. As shown in FIG. 1, the state-of-the-art coating technique includes multiple process steps as described below. In the first step, an organic or aqueous solution including a coating-element source to be coated (hereinafter, referred to as a "coating solution") is added to a lithiated compound to be coated in a mixing vessel and mixed well to coat the compound with the solution. In the second step, the resulting wet compound with the solution is transferred to a shallow tray in order to dry the compound in the air at ambient temperature or at an elevated temperature (for example, 80~100° C.) to shorten the drying time. In the third step, the resulting dried coated compound is further heat-treated at a high temperature (for example, 400~1000° C.). This state-of-the-art coating process has at least two major drawbacks. One drawback is that it is extremely difficult to achieve a uniform coating of the compound, mainly due to the drying process of the wet compound. It is well known that it is almost impossible to achieve a uniform distribution of a solute component when a mass or pile of wet compound with a solution is dried by a conventional passive drying process because the solution migrates over the surface of the mass as the solvent evaporates. The second drawback is the costly processing step of transferring wet compound from one vessel to another as well as the relatively long drying time due to the drying technique of a bulky mass of the compound.

The process of the present invention has overcome these two major drawbacks by eliminating the step of transferring the wet compound from one vessel to another, thus reducing the process steps to a single step and modifying the state-of-the-art drying step to a time-saving uniformity-improving drying technique. This process of the present invention is called a "one-shot process". This one-shot coating process involves adding the coating solution to the compound to be coated in a mixing-and-drying vessel. The mixture is mixed well to coat the compound with the solution, while the compound is still agitated well for mixing, making the process a single continuous step to make the dry coated compound. This newly invented process give a uniformly-distributed coating of the compound with the coating-element source because the non-uniformity sources of the state-of-the-art coating process, i.e., drying of a compound mass, are eliminated in the new process. The process cost is also reduced significantly in the new process due to the reduction of the number of physical steps as well as the reduction in drying time compared to that of the state-of-the-art process.

The lithiated compound is preferably at least one selected from a group consisting of lithiated compounds represented by formulas 1 to 11. Preferably, the lithiated compound includes lithium-cobalt chalcogenide, lithium-manganese chalcogenide, lithium-nickel chalcogenide or lithium-nickel-manganese chalcogenide.

$$Li_xMn_{1-y}M'_yA_2 \quad (1)$$

$$Li_xMn_{1-y}M'_yO_{2-z}X_z \quad (2)$$

$$Li_xMn_2O_{4-z}A_z \quad (3)$$

$$Li_xMn_{2-y}M'_yA_4 \quad (4)$$

$$Li_xM_{1-y}M''_yA_2 \quad (5)$$

$$Li_xMO_{2-z}A_z \quad (6)$$

$$Li_xNi_{1-y}Co_yO_{2-z}A_z \quad (7)$$

$$Li_xNi_{1-y-z}Co_yM''_zA_\alpha \quad (8)$$

$$Li_xNi_{1-y-z}Co_yM''_zO_{2-\alpha}X_\alpha \quad (9)$$

$$Li_xNi_{1-y-z}Mn_yM'_zA_\alpha \quad (10)$$

$$Li_xNi_{1-y-z}Mn_yM'_zO_{2-\alpha}X_\alpha \quad (11)$$

wherein,
$0.95 \leq x \leq 1.1$, $0 \leq y \leq 0.5$, $0 \leq z \leq 0.5$, $0 \leq \alpha \leq 2$, M is Ni or Co, M' is one or more elements selected from a group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, M" is one or more elements selected from a group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, A is selected from a group consisting of O, F, S and P, and X is selected from the group consisting of F, S and P.

The coating element in the coating solution may be any element that is capable of being dissolved in an organic solvent or water. Examples are Mg, Al, Co, K, Na, Ca, Si, Ti, V, Sn, Ge, Ga, B, As, Zr, and any mixtures thereof. Preferred are Al or B.

The coating solution is obtained by dissolving a coating-element source in an organic solvent or water, and preferably refluxing the resulting mixture. The coating-element source includes a coating element or, a coating-element-included alkoxide, salt or oxide of the coating element. Suitable coating-element sources may be chosen from the coating element, the coating-element-included alkoxide, salt or oxide according to the type of the solvent, which are well known to one skilled in the related arts. For example, if the solvent is an organic solvent, then the coating-element-included alkoxide, salt or oxide may be used for the coating-element source. If water is used as the solvent, then only the coating-element-included salt or oxide may be used for the coating-element source. For example, a boron solution may be prepared by dissolving $HB(OH)_2$, $B_2O_3$ or $H_3BO_3$ in either an organic solvent or water.

An exemplary organic solution is a coating element-included alkoxide solution. The alkoxide solution may be prepared by dissolving the coating element in an alcohol such as methanol, ethanol or isopropanol, and refluxing them, or by dissolving a coating element-included alkoxide such as methoxide, ethoxide or isopropoxide in alcohol. For example, tetraethylorthosilicate solution is prepared by dissolving silicate in ethanol. The organic solution or aqueous solution may also be commercially available.

Useful salts or oxides can also include a form of vanadate, such as ammonium vanadate $(NH_4(VO)_3)$ or vanadium oxide $(V_2O_5)$.

The concentration of the coating-element source in the coating solution may be 0.1 to 50 wt %, based on the weight of the coating solution, and preferably 1 to 20 wt %. When the concentration thereof is below 0.1 wt %, the effect obtained by coating the solution onto the lithiated compound may not be sufficient. When the concentration of coating-element source is more than 50 wt %, the resultant coating layer may become undesirably thick.

The preparation of the positive active material of the present invention will be illustrated below in more detail.

The coating solution and the lithiated compound are put into a mixer, and the temperature of the mixer is raised while the content is being mixed (agitated). Additionally, a flushing gas may be introduced into the mixer. The flushing gas helps to facilitate evaporation of a solvent in the coating solution and to purge impure gases that are present in the mixer. The flushing gas may include $CO_2$ and a moisture-free inert gas, such as nitrogen gas or argon gas. Alternatively, the one-shot process may be performed under vacuum rather than using the flushing gas.

Figure 2:
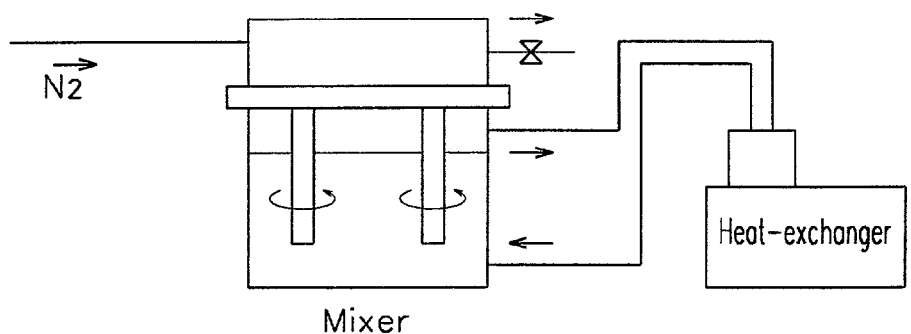
FIG. 2 is a schematic diagram showing an apparatus used in a coating process of the present invention.

The mixer may be any type of mixer as long as the lithiated compound and the coating solution are well mixed and the temperature of the mixer can be raised during the mixing process. A suitable example is a planetary mixer. FIG. 2 shows a planetary mixer with a heat exchanger. As shown in FIG. 2, nitrogen gas as the flushing gas is introduced into the upper portion of the mixer, while hot water is circulated through the heat exchanger around the mixer.

In the coating process, the lithiated compound is coated with the coating solution in the mixer, and the solvent of the coating solution may be evaporated as the process temperature is increased while the process mixture is stirred continuously without stopping. Therefore, the transfer of the solution-coated wet compound to another vessel (a tray) and the drying step in the tray can be combined into a single continuous process ("one-shot") in a single vessel. In order to mix the lithiated compound with the coating solution uniformly, the premixing period prior to the introduction of the flushing gas may be about 10 to 30 minutes.

It is preferable that the mixer temperature ranges from 50 to 100° C., when an alcohol or water is used as the solvent.

The coated material is heat-treated at the temperature ranging from 100 to 1000° C. for about 1 or 20 hours under atmosphere. When the heat-treatment temperature is lower than 100° C., a good lithium ion-conducting coating may not be formed resulting in a failure in facilitation of free movement of the lithium ions through the interface of the active material and electrolyte. When the heat-treatment temperature is higher than 1000° C., a poor lithium ion-conduction coating is formed at the surface of the active material.

During the heat-treatment process, the coated material is changed into an oxide to form an oxide layer (surface-treatment layer) on the lithiated compound. If the coating solution includes an Al or B source, an $Al_2O_3$ or a B-included oxide surface-treatment layer is formed on the core.

The resulting material may be used as a positive active material of a rechargeable lithium battery. The resulting material may be sieved, if needed, to collect powder of a suitable size prior to using it as the positive material.

In summary, the resulting positive active material by the presently invented process is more uniformly coated with the oxide layer than the positive active material coated by the state-of-the-art process.

The following examples further illustrate the present invention, but the invention is not limited by these examples.

EXAMPLE 1

5 g of Al-isopropoxide powder was dissolved in 95 g of ethanol to prepare 5% Al-isopropoxide solution (solution-preparing step).

The Al-isopropoxide solution and 50 g of $LiCoO_2$ powder were put into a mixer with a water-jacket heat exchanger and mixed thoroughly for about 10 minutes. Then, nitrogen gas was injected into the mixer while the mixer chamber temperature was kept at 60° C. by circulating hot water through the heat-exchanger. The mixture was stirred continuously for an additional 30 minutes while dry nitrogen gas was flowing continuously to evaporate ethanol. The resulting dry powder was coated uniformly with an Al-intermediate compound (one-shot process).

The fine powder was heat-treated at 600° C. under flowing air atmosphere (heat-treating process). The heat-treated powder was sieved to collect powder with a suitable size and use it as a positive active material.

EXAMPLE 2

A positive active material was prepared by the same procedure as in Example 1, except that 3 g of Al-isopropoxide powder was dissolved in 97 g of ethanol to prepare 3% Al-isopropoxide solution.

EXAMPLE 3

A positive active material was prepared by the same procedure as in Example 1, except that 1 g of Al-isopropoxide powder was dissolved in 99 g of ethanol to prepare 1% Al-isopropoxide solution.

COMPARATIVE EXAMPLE 1

5 g of Al-isopropoxide powder was dissolved in 95 g of ethanol to prepare 5% of Al-isopropoxide solution (solution-preparing step). 50 g of $LiCoO_2$ powder was added into the Al-isopropoxide solution followed by mixing the content for 30 minutes to coat the powder with the solution. The wet mixture was transferred to an open tray and allowed to stand for 30 minutes to have the excess solvent to be evaporated.

The partially dried mixture was further dried in a drying oven at 100° C. to prepare a fine powder (drying step).

The resulting powder was heat-treated at 600° C. under flowing air (heat-treating step). The resulting powder was sieved to collect a powder with a uniform size and to use it as a positive active material.

COMPARATIVE EXAMPLE 2

A positive active material was prepared by the same procedure as in Comparative Example 1, except that 1 g of Al-isopropoxide powder was mixed with 99 g of ethanol to prepare 1% Al-isopropoxide solution.

COMPARATIVE EXAMPLE 3

A positive active material was prepared by the same procedure as in Comparative Example 1, except that 3 g of Al-isopropoxide powder was mixed with 97 g of ethanol to prepare 3% Al-isopropoxide.

The total preparation times for Example 1 and Comparative Example 1 were measured individually. The preparation time for Example 1 was 2 hours, and that for Comparative Example was 7 hours. Therefore, the preparation method for Example 1 may enhance the productivity of the coating over the method for Comparative Example 1.

In order to examine electrochemical characteristics of the positive active materials, cylindrical cells ("18650" size) were fabricated using the positive active materials prepared according to Example 1 and Comparative Example 2.

The positive active material, a carbon conductive agent, and a polyvinylidene fluoride binder were mixed in a N-methyl pyrrolidone solvent at a ratio of 94:3:3 to make a positive active material slurry. The positive active material slurry was cast on an Al-foil, followed by drying and compressing the cast film make a positive electrode.

Mesocarbon fiber, as a negative active material, and a polyvinylidene fluoride binder were mixed in an N-methyl pyrrolidone solvent at a ratio of 96:4 to make a negative active material slurry. The negative active material slurry was cast on a Cu-foil, followed by drying and compressing the cast film to make a negative electrode.

Using these positive and negative electrodes, cylindrical cells having 1800 mAh of theoretical capacity were fabricated using a commonly used technique.

Figure 3:
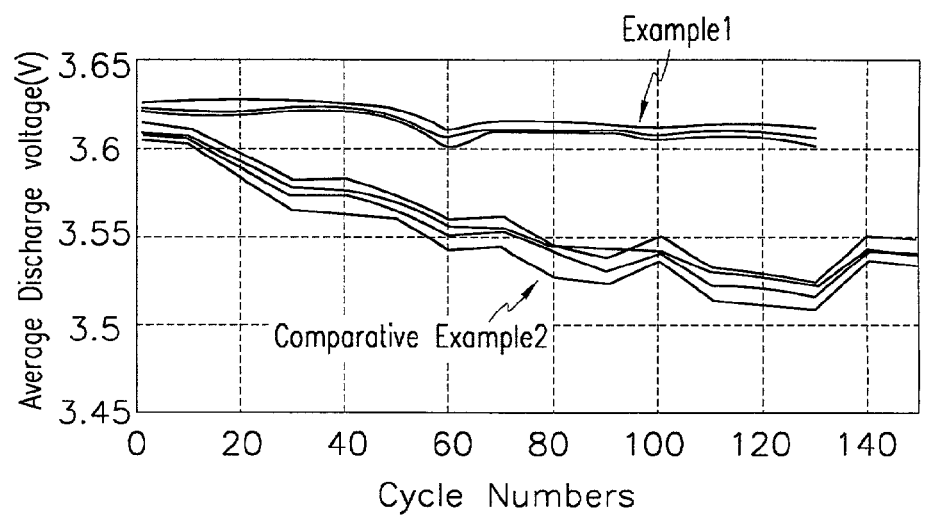
FIG. 3 is a graph illustrating average discharge voltage of the positive active materials according to the Examples of the present invention and Comparative Examples.
Figure 4:
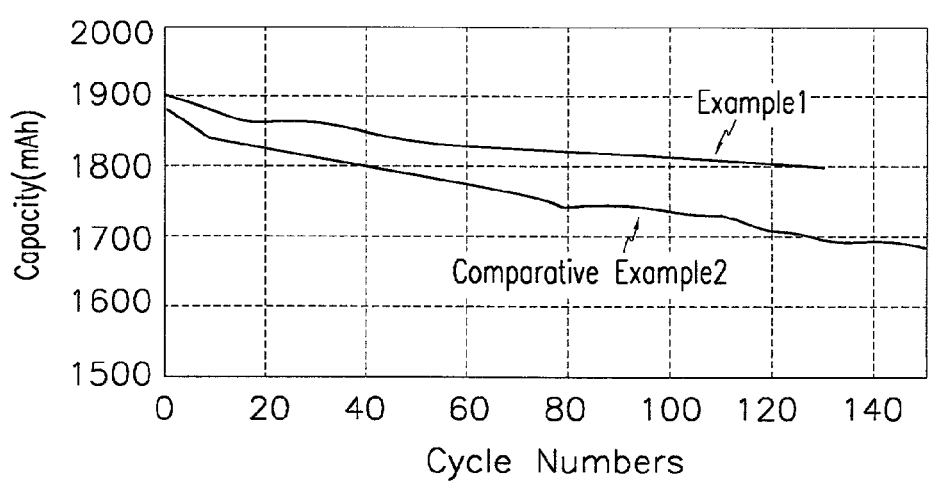
FIG. 4 is a graph illustrating cycle life of the positive active materials according to the Examples of the present invention and Comparative Examples.

Average discharge potentials of the cylindrical cells containing the positive active materials according to Example 1 and Comparative Example 2 are presented in FIG. 3 as a function of life cycles. FIG. 4 shows the capacity of the cells including the positive active materials according to Example 1 and Comparative Example 2.

As shown in FIG. 3, the average discharge voltage of the cells according to Example 1 is substantially (by 0.1 V at 100 cycles) higher than that according to Comparative Example 2.

It is evident from FIG. 4 that the cycle life of the cells including the positive active material according to Example 1 is improved substantially over that of the positive active material according to Comparative Example 2. The internal resistance of the cells according to Example 1 appears to be lower than that of the cells according to Comparative Example 2 as shown by the discharge voltages in FIG. 3.

The results also appear to indicate that the method according to Example 1 enables $LiCoO_2$ to be coated more uniformly with the Al oxide than that according to Comparative Example 2, as indicated by the lower internal resistance of the cells according to Example 1. The coating with an increased uniformity by the process according to Example 1 over the state-of-the-art coating process according to Comparative Example 2 appears to be due to the improved drying technique.

The preparation method of the positive active material of the present invention also enables productivity of the coating process to increase by reducing the preparation time.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a positive active material for a rechargeable lithium battery comprising:
   a) introducing into a mixer a lithiated compound and a solution including an alkoxide of a coating-element source wherein the coating-element source comprises at least one coating element selected from the group consisting of B, Al, Ga, Si, Ge, Sn and As;
   b) coating the lithiated compound with the solution, while increasing the ambient temperature and mixing; and
   c) heat-treating the coated lithiated compound at a temperature between about 100° C. to about 1000° C. to form a surface-treatment layer on the surface of the lithiated compound.

2. The method of preparing a positive active material of claim 1 wherein the lithiated compound is one or more lithiated compounds selected from the group consisting of compounds represented by the formulas 1 to 11:

$$Li_xMn_{1-y}M'_yA_2 \qquad (1)$$

$$Li_xMn_{1-y}M'_yO_{2-z}X_z \qquad (2)$$

$$Li_xMn_2O_{4-z}A_z \qquad (3)$$

$$Li_xMn_{2-y}M'_yA_4 \qquad (4)$$

$$Li_xM_{1-y}M''_yA_2 \qquad (5)$$

$$Li_xMO_{2-z}A_z \qquad (6)$$

$$Li_xNi_{1-y}Co_yO_{2-z}A_z \qquad (7)$$

$$Li_xNi_{1-y-z}Co_yM''_zA_\alpha \qquad (8)$$

$$Li_xNi_{1-y-z}Co_yM''_zO_{2-\alpha}X_\alpha \qquad (9)$$

$$Li_xNi_{1-y-z}Mn_yM'_zA_\alpha \qquad (10)$$

$$Li_xNi_{1-y-z}Mn_yM'_zO_{2-\alpha}X_\alpha \qquad (11)$$

wherein, $0.95 \leq x \leq 1.1, 0 \leq y \leq 0.5, 0 \leq z \leq 0.5, 0 \leq \alpha \leq 2$, M is Ni or Co, M' is one or more elements selected from a group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, M" is one or more elements selected from a group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, A is selected from the group consisting of O, F, S and P, and X is selected from the group consisting of F, S, and P.

3. The method of preparing a positive active material of claim 1 wherein the coating step further comprises introducing a flushing gas into the mixer.

4. The method of preparing a positive active material of claim 1 wherein the coating step is performed under vacuum.

5. The method of preparing a positive active material of claim 1 wherein the temperature of the mixer is kept in the range of 50° C. to 100° C.

6. The method of preparing a positive active material of claim 1 wherein the concentration of the coating element source in the solution ranges from 0.1 to 50 wt %.

7. The method of preparing a positive active material of claim 6 wherein the concentration of the coating element source in the ranges from 1 to 20 wt %.

8. The method of preparing a positive active material of claim 1 wherein the coating element is Al or B.

9. The method of preparing a positive active material of claim 1 wherein the heat-treating process is performed under flowing air for 1 to 20 hours.

10. A method of preparing a positive active material for a rechargeable lithium battery comprising:
    a) introducing a lithiated compound and a solution including an alkoxide of a coating-element source, the lithiated compound being selected from the group consisting of lithium-cobalt chalcogenide, lithium-manganese chalcogenide, lithium-nickel chalcogenide and lithium-nickel-manganese chalcogenide wherein the coating-element source comprises at least one coating element selected from the group consisting of B, Al, Ga, Si, Ge, Sn and As;
    b) coating the compound with the solution, while increasing the temperature of the mixer and mixing; and
    c) heat-treating the coated compound at a temperature between about 100° C. and about 1000° C. to form a surface-treatment layer on the surface of the compound.

11. The method of preparing a positive active material of claim 10 wherein the coating step further comprises introducing a flushing gas into the mixer.

12. The method of preparing a positive active material of claim 10 wherein the coating step is performed under vacuum.

13. The method of preparing a positive active material of claim 10 wherein the temperature of the mixer is kept in the range of 50° C. to 100° C.

14. The method of preparing a positive active material of claim 10 wherein the concentration of the coating element source in the solution ranges from 0.1 to 50 wt %.

15. The method of preparing a positive active material of claim 14 wherein the concentration of the coating element source in the solution ranges from 1 to 20 wt %.

16. The method of preparing a positive active material of claim 10, wherein the coating element is Al or B.

17. The method of preparing a positive active material of claim 10 wherein the heat-treating process is performed under flowing air for 1 to 20 hours.

18. The method of preparing a positive active material for a rechargeable lithium battery comprising:
  a) introducing a lithiated compound and a solution including an alkoxide of an Al source or a B source, the lithiated compound being selected from the group consisting of lithium-cobalt chalcogenide, lithium-manganese chalcogenide, lithium-nickel chalcogenide and lithium-nickel-manganese chalcogenide;
  b) coating the compound with the solution, while increasing the temperature of the mixer and mixing; and
  c) heat-treating the coated compound at a temperature between about 100° C. and about 1000° C. to form an $Al_2O_3$ or B-included oxide surface-treatment layer on the surface of the compound.

19. The method of preparing a positive active material of claim 18 wherein the coating step further comprises introducing a flushing gas into the mixer.

20. The method of preparing a positive active material of claim 18 wherein the coating step is performed under vacuum.

21. The method of preparing a positive active material of claim 18 wherein the temperature of the mixer is kept in the range of 50° C. to 100° C.

22. The method of preparing a positive active material of claim 18 wherein the concentration of Al or B in the ranges from 0.1 to 50 wt %.

23. The method of preparing a positive active material of claim 22 wherein the concentration of the coating element in the solution ranges from 1 to 20 wt %.

24. The method of preparing a positive active material of claim 18 wherein the heat-treating process is performed under flowing air for 1 to 20 hours.

* * * * *